(12) United States Patent
Yu

(10) Patent No.: US 10,218,909 B2
(45) Date of Patent: Feb. 26, 2019

(54) CAMERA DEVICE, METHOD FOR CAMERA DEVICE, AND NON-TRANSITORY COMPUTER READABLE STORAGE MEDIUM

(71) Applicant: HTC Corporation, Taoyuan (TW)

(72) Inventor: Wen-Hsiang Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/359,571

(22) Filed: Nov. 22, 2016

(65) Prior Publication Data

US 2017/0201683 A1    Jul. 13, 2017

Related U.S. Application Data

(60) Provisional application No. 62/276,247, filed on Jan. 8, 2016.

(51) Int. Cl.
*H04N 5/232*    (2006.01)

(52) U.S. Cl.
CPC ..... *H04N 5/23287* (2013.01); *H04N 5/23258* (2013.01); *H04N 5/23261* (2013.01)

(58) Field of Classification Search
CPC ........... H04N 5/23258; H04N 5/23261; H04N 5/23287; H04N 5/23264–5/2329; G03B 5/02; G03B 2205/0007–2205/0038; G03B 2217/005; G02B 27/64; G02B 27/646
See application file for complete search history.

(56) References Cited

U.S. PATENT DOCUMENTS

| | | | | |
|---|---|---|---|---|
| 2002/0027599 A1* | 3/2002 | Yamazaki | .......... | H04N 5/23248 |
| | | | | 348/208.99 |
| 2015/0042828 A1* | 2/2015 | Wakamatsu | ....... | H04N 5/23254 |
| | | | | 348/208.4 |
| 2016/0269640 A1* | 9/2016 | Watanabe | .......... | H04N 5/23267 |

* cited by examiner

*Primary Examiner* — Paul M Berardesca
(74) *Attorney, Agent, or Firm* — CKC & Partners Co., Ltd.

(57) ABSTRACT

A method includes acquiring an angular velocity signal, calculating an angular displacement according to the angular velocity signal, generating a compensation value according to a frequency corresponding to the angular velocity signal and the angular displacement, and controlling an optical image stabilization (OIS) system to align an optical axis of a camera of the camera device according to the compensation value.

17 Claims, 4 Drawing Sheets

CAMERA DEVICE, METHOD FOR CAMERA DEVICE, AND NON-TRANSITORY COMPUTER READABLE STORAGE MEDIUM

RELATED APPLICATIONS

This application claims priority to Provisional U.S. Application Ser. No. 62/276,247 filed Jan. 8, 2016, which is herein incorporated by reference.

BACKGROUND

Technical Field

The present disclosure relates to an electronic device, a method, and a non-transitory computer readable storage medium. More particularly, the present disclosure relates to a camera device, a method for a camera device, and a non-transitory computer readable storage medium.

Description of Related Art

With advances in electronic technology, camera devices, such as smart phones and tablet computers, are being increasingly used.

A camera device may include a camera and a stabilization system. The stabilization system is configured to compensate for vibrations of the camera, so that even if the camera is shaken when capturing an image or a recording a video, distortion of the image or video can be avoided. However, due to limitations with respect to the sizes of the actuators in the stabilization system, an artifact such as "rolling shutter" or "jello effect" may occur.

SUMMARY

One aspect of the present disclosure is related to a method. In accordance with one embodiment of the present disclosure, the method includes acquiring an angular velocity signal, calculating an angular displacement according to the angular velocity signal, generating a compensation value according to a frequency corresponding to the angular velocity signal and the angular displacement, and controlling an optical image stabilization (OIS) system to align an optical axis of a camera of the camera device according to the compensation value.

Another aspect of the present disclosure is related to a camera device. In accordance with one embodiment of the present disclosure, the camera device includes a camera, an optical image stabilization (OIS) system, one or more processing components, memory, and one or more programs. The one or more processing components are electrically connected to the camera and the OIS system. The memory is electrically connected to the one or more processing components. The one or more programs are stored in the memory and configured to be executed by the one or more processing components. The one or more programs include instructions for acquiring an angular velocity signal, calculating an angular displacement according to the angular velocity signal, generating a compensation value according to a frequency corresponding to the angular velocity signal and the angular displacement, and controlling an optical image stabilization (OIS) system to align an optical axis of a camera of the camera device according to the compensation value.

Another aspect of the present disclosure is related to a non-transitory computer readable storage medium. In accordance with one embodiment of the present disclosure, the non-transitory computer readable storage medium storing one or more programs includes instructions, which when executed, causes one or more processing components to perform operations including acquiring an angular velocity signal, calculating an angular displacement according to the angular velocity signal, generating a compensation value according to a frequency corresponding to the angular velocity signal and the angular displacement, and controlling an optical image stabilization (OIS) system to align an optical axis of a camera of the camera device according to the compensation value.

Through the operations of one embodiment described above, the influence of the jello effect can be reduced.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
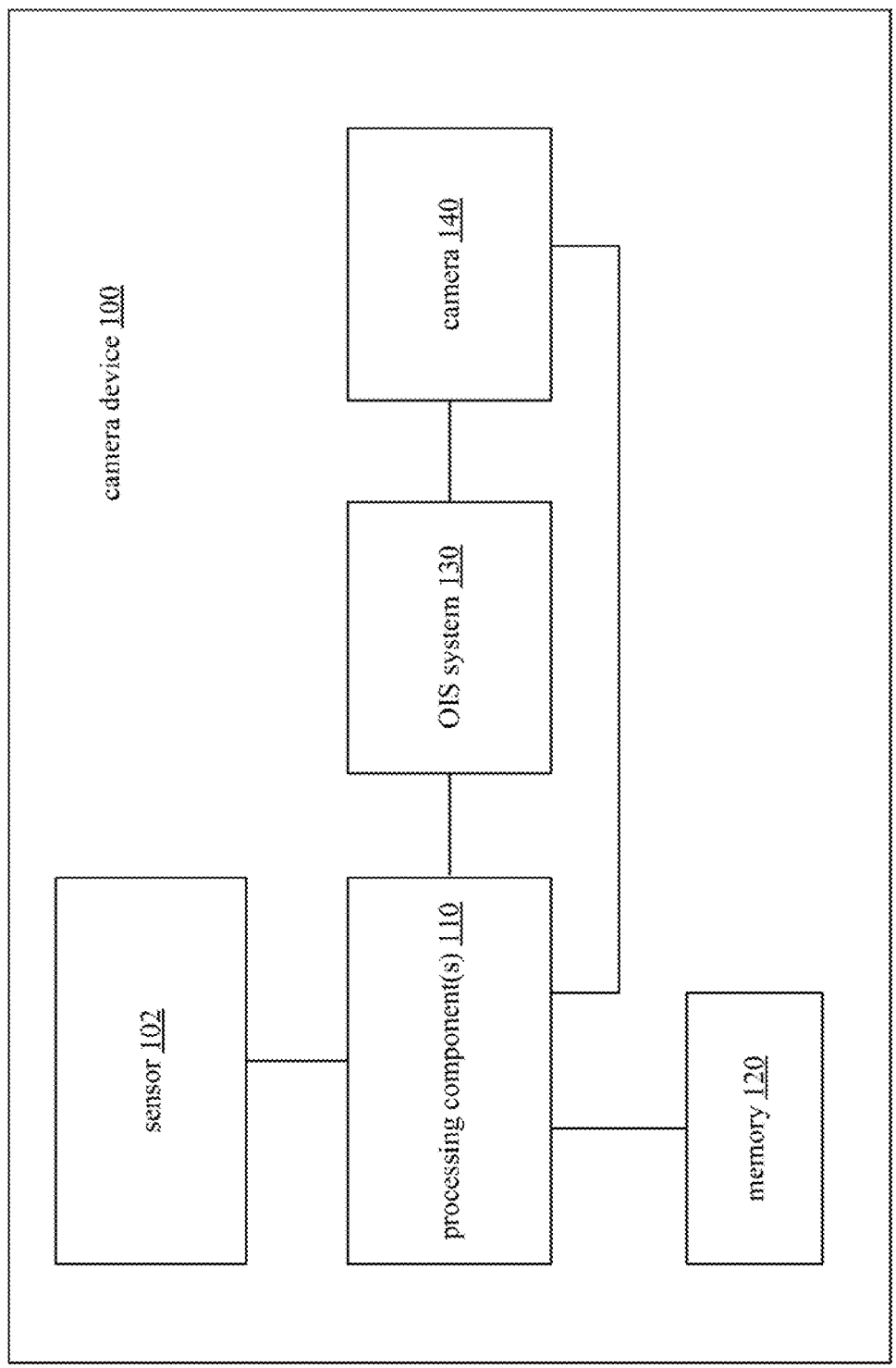
FIG. 1 is a schematic block diagram of a camera device in accordance with one embodiment of the present disclosure.

Reference will now be made in detail to the present embodiments of the invention, examples of which are illustrated in the accompanying drawings. Wherever possible the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, in the description herein and throughout the claims that follow, "around," "about," "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures or operations. Numerical quantities given herein are approximate, meaning that the term "around," "about," "approximately" or "substantially" can be inferred if not expressly stated, or meaning other approximate values.

Any element in a claim that does not explicitly state "means for" performing a specified unction, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a camera device. In the paragraphs below, a smart phone will be taken as an example to describe details of the camera device. However, another camera device, such as a tablet computer or a camera, is within the contemplated scope of the present disclosure.

FIG. 1 is a schematic block diagram of a camera device 100 in accordance with one embodiment of the present disclosure. In this embodiment, the camera device 100 includes at least one sensor 102, one or more processing components 110, a memory 120, an optical image stabilization (OIS) system 130, and a camera 140. In this embodiment, the processing component 110 is electrically connected to the sensor 102, the memory 120, the OIS system 130, and the camera 140. The OIS system 130 is electrically connected to the camera 140.

In one embodiment, the at least one sensor 102 may be realized by, for example, one or more gyro sensors, one or more angular velocity sensors, or an assembly of one or more angular velocity sensors and one or more acceleration sensors, but is not limited in this regard. In one embodiment, the one or more processing components 110 can be realized by, for example, one or more processors, such as central processors and/or microprocessors, but are not limited in this regard. The memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash disk, a tape, a database accessible from a network, or any storage medium with the same functionality that can be contemplated by persons of ordinary skill in the art to which this invention pertains.

In one embodiment, the one or more processing components 110 may run or execute various software programs and/or sets of instructions stored in the memory 120 to perform various functions for the camera device 100 and to process data.

In one embodiment, the sensor 102 may be disposed on the camera device 100. The sensor 102 may be configured to detect an angular velocity of the camera device 100 and accordingly generate an angular velocity signal. The one or more processing components 110 are configured to generate a compensation value according to a frequency corresponding to the angular velocity signal and an angular displacement calculated from the angular velocity signal, and control the OIS system 130 to align an optical axis of the camera 140 according to the compensation value. In one embodiment, the OIS system 130 may align the optical axis of the camera 140 by using actuators of the OIS system 130.

In one embodiment, the compensation value used herein may indicate or correspond to a distance of at least one of the camera 140, an image sensor of the camera 140, or a lens of the camera 140 that should be moved to align the optical axis of the camera 140.

In some approaches, due to physical limitations (namely, the size limitations of the actuators), there is an upper bound of the compensation value. When the compensation value is greater than the upper bound, the optical axis of the camera 140 is aligned improperly, thereby causing the jello effect.

Thus, in one embodiment of the present disclosure, the generation of the compensation value is adjusted.

In one embodiment, the one or more processing components 110 determines the compensation value by using one or both of a first adjusting filter (a spatial filter) and a second adjusting filter (a frequency filter).

Figure 2B:
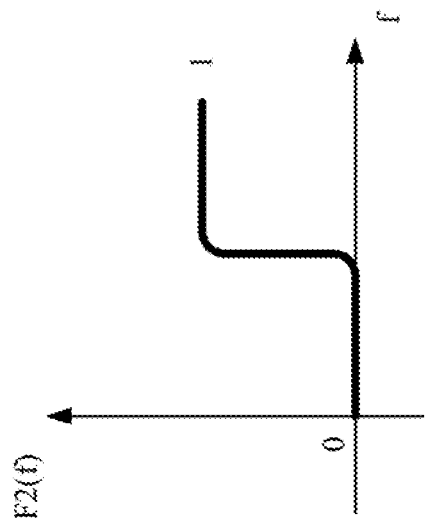
FIG. 2b illustrates a graph of a function of a second adjusting filter in accordance with one embodiment of the present disclosure.
Figure 2A:
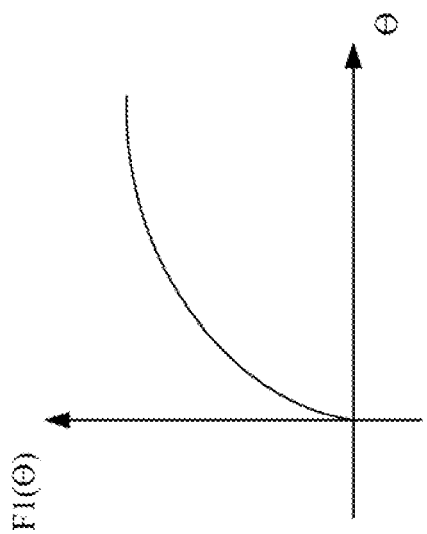
FIG. 2a illustrates a graph of a function of a first adjusting filter in accordance with one embodiment of the present disclosure.

In one embodiment, the first adjusting filter (the spatial filter) corresponds to a first function of the angular displacement, and an order of the first function is less than 1. For example, referring to FIG. 2a, in one embodiment, a function value of the first function F1(☐) may be equal to the square root of the angular displacement ☐ (i.e., F1(☐)= ☐^(½)), in which the function value of the first function F1(☐) is positively correlated with the compensation value. It should be noted that the order of the first function can be another value, such as 0.9, 0.8, ⅔, ⅓, and the present disclosure should not be limited by the embodiment above.

In some approaches, the compensation value and the angular displacement are linear. In such a case, when vibrations of the camera device 100 are strong, the compensation value frequently becomes greater than said upper bound, therefore causing the jello effect.

However, in one embodiment of the present disclosure, since the order of the first function is less than 1, the higher the angular displacement, the more the compensation value is suppressed. Thus, under a heavy vibration condition, the compensation value can be kept under said upper bound most of the time, and the influence of the jello effect can be reduced.

In addition to adjusting the compensation value by using the spatial filter described above, the compensation value can also be adjusted in accordance with the frequency corresponding to the angular velocity signal.

For example, when the frequency corresponding to the angular velocity signal is lower than a predetermined threshold (but is greater than zero), this may indicate that the camera device 100 is rotated (e.g., the holder of the camera device 100 has turned left or right), rather than that the camera device 100 is vibrating. Thus, under such a condition, the compensation value and the alignment of the optical axis of the camera 140 should be decreased. In one embodiment, when the frequency corresponding to the angular velocity signal is lower than the predetermined threshold, the compensation value and the alignment of the optical axis of the camera 140 are substantially equal to 0.

However, when the frequency corresponding to the angular velocity signal is higher than the predetermined threshold, this may indicate that the camera device 100 has vibrated (e.g., caused by the user's hand), and the one or more processing components 110 should not suppress or slightly decrease the compensation value.

In one embodiment, the second adjusting filter (the frequency filter) can be a high-pass filter of the frequency corresponding to the angular velocity signal. In one embodiment, the second adjusting filter corresponds to a second function of the frequency corresponding to the angular velocity signal, and the function value of the second function is positively correlated with the compensation value. For example, referring to FIG. 2b, in one embodiment, when the frequency f corresponding to the angular velocity signal is lower than a predetermined threshold, a function value of the second function $F2(\cdot)$ is substantially equal to 0, and when the frequency f corresponding to the angular velocity signal is greater than or equal to the predetermined threshold, the function value of the second function $F2(\cdot)$ is substantially equal to 1. It should be noted that function values of the second function $F2(\cdot)$ can be other values on the basis of actual requirements, and the present disclosure is not limited by the embodiment above.

In some approaches, when the camera device 100 rotates, the angular displacement is large, and the compensation value is frequently greater than said upper bound, therefore causing the jello effect.

However, by using the frequency filter described above, when the camera device 100 rotates, the compensation value is decreased, so that the compensation value can be kept under said upper bound, and the influence of the jello effect can be reduced.

In some embodiments, an original compensation value $\Delta d_{ori}$, the frequency f, and the angular displacement $\theta$ satisfy the following equation:

$$\tan \theta = \Delta d_{ori}/f$$

In some embodiments, the compensation value $\Delta d$ may be positively correlated with the original compensation value $\Delta d_{ori}$, the function value of the first function $F1(\cdot)$, and/or the function value of the second function $F2(\cdot)$. For example, the compensation value $\Delta d$ may be equal to or correspond to a product of the original compensation value $\Delta d_{ori}$, the function value of the first function $F1(\cdot)$, and the function value of the second function $F2(\cdot)$, but the present disclosure is not limited by the embodiment above. Another calculation method of the compensation value $\Delta d$ is within the contemplated scope of the present disclosure.

Another aspect of the present disclosure is described in the paragraphs below with reference to an operating method in FIG. 3. However, the present disclosure is not limited to the embodiment below.

It should be noted that the operating method can be applied to a camera device having a structure that is the same as or similar to the structure of the camera device 100 shown in FIG. 1. To simplify the description below, the embodiment shown in FIG. 1 will be used as an example to describe the operating method according to an embodiment of the present disclosure. However, the present disclosure is not limited to application to the embodiment shown in FIG. 1.

It should be noted that, in some embodiments, the operating method may be implemented as a computer program. When the computer program is executed by a computer, an electronic device, or the one or more processing components 110 in FIG. 1, this executing device performs the operating method. The computer program can be stored in a non-transitory computer readable medium such as a ROM (read-only memory), a flash memory, a floppy disk, a hard disk, an optical disc, a flash drive, a tape, a database accessible from a network, or any storage medium with the same functionality that can be contemplated by persons of ordinary skill in the art to which this invention pertains.

In addition, it should be noted that in the operations of the following operating method, no particular sequence is required unless otherwise specified. Moreover, the following operations also may be performed simultaneously or the execution times thereof may at least partially overlap.

Furthermore, the operations of the following operating method may be added to, replaced, and/or eliminated as appropriate, in accordance with various embodiments of the present disclosure.

Figure 3:
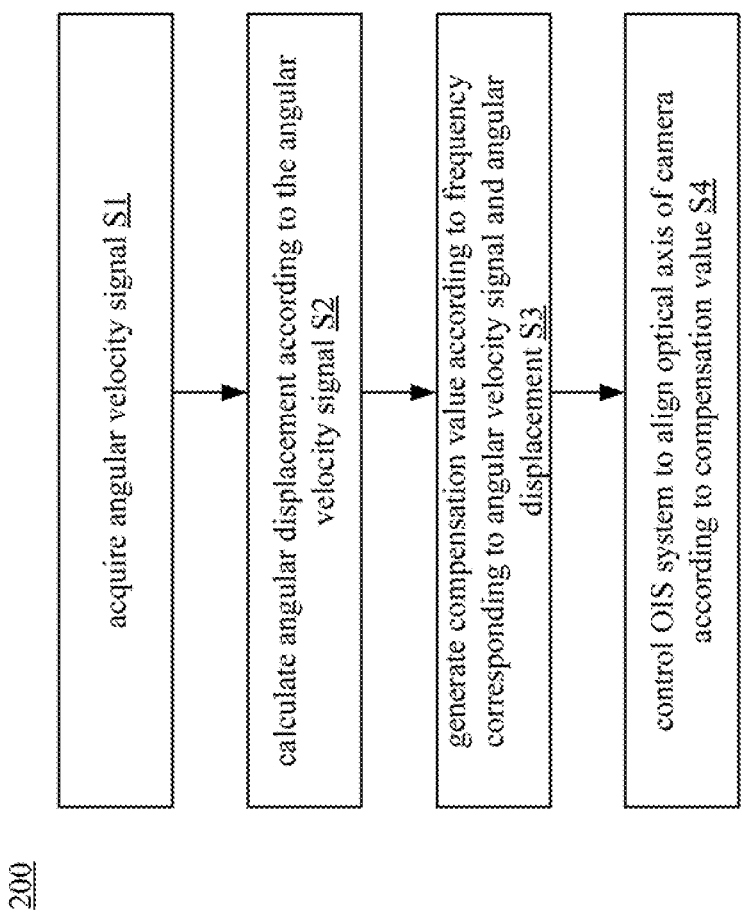
FIG. 3 is a flowchart of an operating method in accordance with one embodiment of the present disclosure.

Reference is made to FIGS. 1 and 3. The operating method 200 includes the operations below.

In operation S1, the one or more processing components 110 acquire an angular velocity signal. In one embodiment, the angular velocity signal is generated by the sensor 102. In one embodiment, the angular velocity signal corresponds to the angular velocity of the camera device 100.

In operation S2, the one or more processing components 110 calculate an angular displacement according to the angular velocity signal. In one embodiment, the one or more processing components 110 integrate the angular velocity of the camera device 100 (e.g., by an integrator) to generate the angular displacement of the camera device 100.

In operation S3, the one or more processing components 110 generate a compensation value according to a frequency corresponding to the angular velocity signal and the angular displacement.

In one embodiment, the one or more processing components 110 determine the compensation value by using one or both of the first adjusting filter and the second adjusting filter. Details of the calculation of the compensation value can be ascertained with reference to the paragraphs above, and a description in this regard will not be repeated herein.

In operation S4, the one or more processing components 110 control the OIS system 130 to align the optical axis of the camera 140 according to the compensation value.

Through the operations described above, the influence of the jello effect can be reduced.

Figure 4:
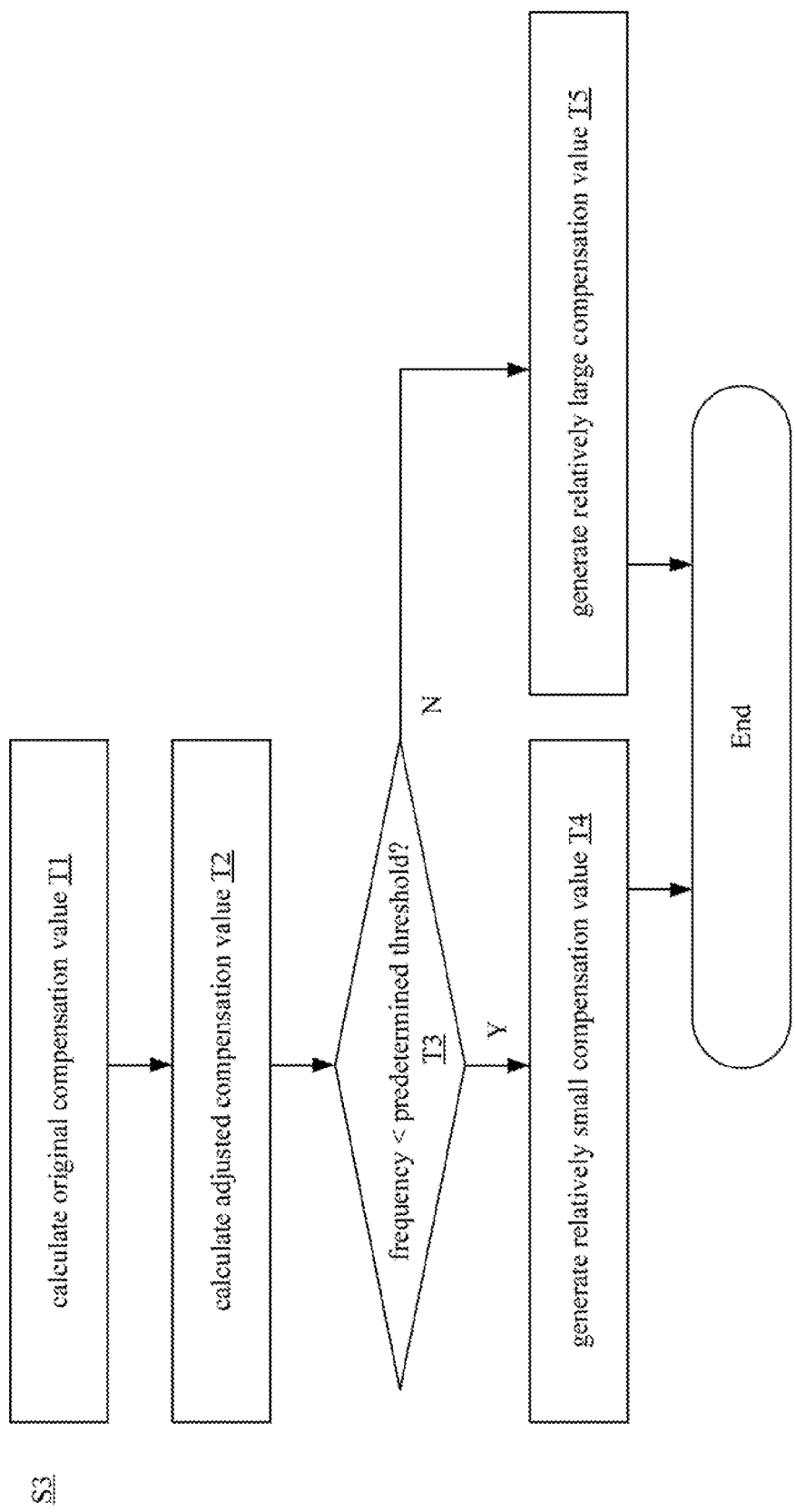
FIG. 4 is a flowchart of one operation in an operating method in accordance with one embodiment of the present disclosure.

In different embodiments, operation S3 of FIG. 3 may include operations T1-T5, as shown in FIG. 4.

In operation T1, the one or more processing components 110 calculate an original compensation value according to the frequency corresponding to the angular velocity signal and the angular displacement. Details of the calculation of the original compensation value can be ascertained with reference to the paragraphs above, and a description in this regard will not be repeated herein.

In operation T2, the one or more processing components 110 calculate an adjusted compensation value by using the first adjusting filter described above. In one embodiment, the adjusted compensation value may be equal to the product of the original compensation value and the function value of the adjusting first function.

In operation T3, the one or more processing components 110 determine whether the frequency corresponding to the angular velocity signal is lower than the predetermined threshold. If so, operation T4 is performed. If not, operation T5 is performed.

In operation T4, under a condition that the frequency corresponding to the angular velocity signal is lower than the predetermined threshold, the one or more processing components 110 generate the compensation value with a relatively small value or a value that is substantially equal to 0.

In operation T5, under a condition that the frequency corresponding to the angular velocity signal is not lower than the predetermined threshold, the one or more processing components 110 generate the compensation value with a relatively large value.

In one embodiment, the compensation value may be equal to a product of the adjusted compensation value and a function value of the second function of the second adjusting filter, in which the function value of the second function of the second adjusting filter may be substantially equal to 0 under the case of operation T4, and may be a larger value (e.g., 1) under the case of operation T5, but the present disclosure is not be limited by the embodiment above.

Although the present invention has been described in considerable detail with reference to certain embodiments thereof, other embodiments are possible. Therefore, the scope of the appended claims should not be limited to the description of the embodiments contained herein.

What is claimed is:

1. A method applied to a camera device comprising:
   acquiring an angular velocity signal;
   calculating an angular displacement according to a high frequency portion and a low frequency portion of the angular velocity signal;
   generating a compensation value according to the angular displacement;
   adjusting the compensation value according to a frequency corresponding to the angular velocity signal to generate an adjusted compensation value, wherein the adjusted compensation value is determined by using a first adjusting filter, the first adjusting filter corresponds to a first function of the angular displacement, and an order of the first function is less than 1; and
   controlling an optical image stabilization (OIS) system to align an optical axis of a camera of the camera device according to the adjusted compensation value.

2. The method as claimed in claim 1, wherein under a condition that the frequency corresponding to the angular velocity signal is lower than a predetermined threshold, the alignment of the optical axis of the camera is substantially equal to 0.

3. The method as claimed in claim 1, wherein the operation of adjusting the compensation value comprises:
   determining the adjusted compensation value by using a second adjusting filter, wherein the second adjusting filter corresponds to a second function of the frequency corresponding to the angular velocity signal.

4. The method as claimed in claim 3, wherein the second adjusting filter is a high-pass filter.

5. The method as claimed in claim 3, wherein the adjusted compensation value is positively correlated with a function value of the second function.

6. The method as claimed in claim 3, wherein under a condition that the frequency corresponding to the angular velocity signal is lower than a predetermined threshold, a function value of the second function is substantially equal to 0.

7. A camera device comprising:
   a camera;
   an optical image stabilization (OIS) system;
   one or more processing components electrically connected to the camera and the OIS system;
   memory electrically connected to the one or more processing components; and
   one or more programs, wherein the one or more programs are stored in the memory and configured to be executed by the one or more processing components, the one or more programs comprising instructions for:
      acquiring an angular velocity signal;
      calculating an angular displacement according to a high frequency portion and a low frequency portion of the angular velocity signal;
      generating a compensation value according to the angular displacement;
      adjusting the compensation value according to a frequency corresponding to the angular velocity signal to generate an adjusted compensation value, wherein the adjusted compensation value is determined by using a first adjusting filter, the first adjusting filter corresponds to a first function of the angular displacement, and an order of the first function is less than 1; and
      controlling an optical image stabilization (OIS) system to align an optical axis of a camera of the camera device according to the adjusted compensation value.

8. The camera device as claimed in claim 7, wherein under a condition that the frequency corresponding to the angular velocity signal is lower than a predetermined threshold, the alignment of the optical axis of the camera is substantially equal to 0.

9. The camera device as claimed in claim 7 comprising instructions for:
   determining the adjusted compensation value by using a second adjusting filter, wherein the second adjusting filter corresponds to a second function of the frequency corresponding to the angular velocity signal.

10. The camera device as claimed in claim 9, wherein the second adjusting filter is a high-pass filter.

11. The camera device as claimed in claim 9, wherein the adjusted compensation value is positively correlated with a function value of the second function.

12. The camera device as claimed in claim 9, wherein under a condition that the frequency corresponding to the angular velocity signal is lower than a predetermined threshold, a function value of the second function is substantially equal to 0.

13. A non-transitory computer readable storage medium storing one or more programs comprising instructions, which when executed, causes one or more processing components to perform operations comprising:
   acquiring an angular velocity signal;
   calculating an angular displacement according to a high frequency portion and a low frequency portion of the angular velocity signal;
   generating a compensation value according to the angular displacement;
   adjusting the compensation value according to a frequency corresponding to the angular velocity signal to generate an adjusted compensation value, wherein the adjusted compensation value is determined by using a first adjusting filter, the first adjusting filter corresponds to a first function of the angular displacement, and an order of the first function is less than 1; and controlling an optical image stabilization (OIS) system to align an optical axis of a camera of the camera device according to the adjusted compensation value.

14. The non-transitory computer readable storage medium as claimed in claim 13, wherein under a condition that the frequency corresponding to the angular velocity signal is lower than a predetermined threshold, the alignment of the optical axis of the camera is substantially equal to 0.

15. The non-transitory computer readable storage medium as claimed in claim 13 comprising instructions, which when executed, causes the one or more processing components to perform operations comprising:

determining the adjusted compensation value by using a second adjusting filter, wherein the second adjusting filter corresponds to a second function of the frequency corresponding to the angular velocity signal.

16. The non-transitory computer readable storage medium as claimed in claim 15, wherein the second adjusting filter is a high-pass filter.

17. The non-transitory computer readable storage medium as claimed in claim 15, wherein the adjusted compensation value is positively correlated with a function value of the second function, and under a condition that the frequency corresponding to the angular velocity signal is lower than a predetermined threshold, the function value of the second function is substantially equal to 0.

* * * * *